US012290913B2

(12) United States Patent
Voth

(10) Patent No.: US 12,290,913 B2
(45) Date of Patent: May 6, 2025

(54) STAND ASSEMBLY FOR PROPANE TANKS

(71) Applicant: John William Voth, Camrose County (CA)

(72) Inventor: John William Voth, Camrose County (CA)

( * ) Notice: Subject to any disclaimer, the term of this patent is extended or adjusted under 35 U.S.C. 154(b) by 16 days.

(21) Appl. No.: 18/120,472

(22) Filed: Mar. 13, 2023

(65) Prior Publication Data

US 2023/0294266 A1 Sep. 21, 2023

Related U.S. Application Data

(60) Provisional application No. 63/319,803, filed on Mar. 15, 2022.

(51) Int. Cl.
*B25H 1/00* (2006.01)
*B25H 1/12* (2006.01)

(52) U.S. Cl.
CPC ............. *B25H 1/0042* (2013.01); *B25H 1/12* (2013.01)

(58) Field of Classification Search
CPC ....... B25H 1/0042; B25H 1/12; B25H 1/0021
USPC ... 248/121, 313, 689, 671, 676, 519, 80, 79, 248/82, 89, 127, 154, 231.71, 231.9, 310
See application file for complete search history.

(56) References Cited

U.S. PATENT DOCUMENTS 840,406 A * 1/1907 Williams ................ G09F 17/00 248/231.71
1,178,965 A * 4/1916 Stroecker .................. E06C 7/14 248/210
2,606,732 A * 8/1952 Luomala ................... A01J 9/04 220/592.12
4,130,214 A * 12/1978 Sobson ................... A47L 13/51 15/264
4,322,049 A * 3/1982 Holland .............. A47J 37/0713 248/312.1
4,506,853 A * 3/1985 Cathey ..................... B23K 5/22 242/129
4,700,830 A * 10/1987 O'Brien .................. B05C 21/00 206/229
5,064,154 A * 11/1991 Payne .................... A45D 20/12 248/314
5,111,538 A * 5/1992 Chapman .................. F24H 1/06 4/603
5,458,309 A * 10/1995 Craven, Jr. ......... A47J 37/0713 126/41 R
5,494,199 A * 2/1996 Anderson ............. B05B 9/0426 137/590
5,520,607 A * 5/1996 Frassica ............. A61B 1/00142 600/102

(Continued)

FOREIGN PATENT DOCUMENTS

FR 2967403 A1 5/2012
WO WO1998051196 11/1998

OTHER PUBLICATIONS

"Tiger Foot (Propane Tank Torch Holder/Bracket)", www.tigertorchltd.com/products/tiger-foot-propane-tank-torch-holder-bracket, Printed Feb. 13, 2024; first accessed Apr. 26, 2021.

*Primary Examiner* — Christopher Garft
*Assistant Examiner* — Michael McDuffie
(74) *Attorney, Agent, or Firm* — Craig Sherburne

(57) ABSTRACT

The present invention provides for a novel storage stand for propane torches and their hoses, which may be reversibly secured to a standard propane cylinder providing for improved storage of the propane torch.

3 Claims, 7 Drawing Sheets

(56) References Cited

U.S. PATENT DOCUMENTS

| | | | | |
|---|---|---|---|---|
| 5,816,549 | A * | 10/1998 | Anderson | B44D 3/126 248/210 |
| 6,056,255 | A | 5/2000 | Mende | |
| 6,283,418 | B1 * | 9/2001 | Kerspilo, Jr. | A63B 55/50 206/315.7 |
| 6,726,159 | B2 * | 4/2004 | Brake | B62B 1/264 248/150 |
| 6,863,198 | B1 * | 3/2005 | Darby | B60R 7/02 224/570 |
| 6,976,502 | B1 * | 12/2005 | Bibow | F16L 3/003 137/355.16 |
| 7,195,031 | B2 * | 3/2007 | Trettin | F17C 1/00 137/355.16 |
| 7,506,386 | B1 * | 3/2009 | Adrian | F24H 1/08 122/18.1 |
| 7,748,677 | B2 | 7/2010 | Neckel | |
| 8,677,680 | B2 * | 3/2014 | Schuster | A01M 1/2094 43/130 |
| 2013/0292521 | A1 * | 11/2013 | Chepurny | A61G 12/008 248/97 |
| 2014/0196788 | A1 | 7/2014 | Taft | |

* cited by examiner

STAND ASSEMBLY FOR PROPANE TANKS

FIELD OF THE INVENTION

The present invention pertains to the stands capable of attachment to compressed gas cylinders by way of the valve protecting collars common on propane bottles and like gas cylinders.

BACKGROUND OF THE INVENTION

All of the publications, patents and patent applications cited within this application are herein incorporated by reference in their entirety to the same extent as if the disclosure of each individual publication, patent application or patent was specifically and individually indicated to be incorporated by reference in its entirety.

Cylinders containing compressed, combustible, gases such as propane have found utility in the commercial, industrial, agricultural and residential consumer market. Capable of containing significant amounts of fuel for combustion in heaters, cooktops, stoves or barbeques the gas cylinder provides a convenient and, in the smaller sizes such as the colloquially known "20 pound" propane tank (a "Standard Propane Cylinder"), contain up to 4.7 gallons of liquid propane. With a full weight of 37 pounds, and empty of 17, combined with their broad, squat stature, the Standard Propane Cylinder represents a safe and portable means for transporting combustible fuel.

There are a number of commercially available attachments, designed to receive propane from the standard propane cylinder and project the gaseous fuel from a nozzle capable of being ignited; representing a "propane torch", with the Tiger Torch™ achieving significant market success and being used for a variety of purposes. The Tiger Torch™ is comprised of an input aperture designed to form a reversible seal with the output of the Standard Propane Cylinder, a nozzle which provides for mixing of air with the propane gas passing through the nozzle, and tubing connecting the nozzle and the input aperture. While the Standard Propane Cylinder is portable, as is the exemplary propane torch, the art is in need of a device capable of providing integrated storage of a propane torch, or any accessory normally associated with, the standard propane cylinder.

SUMMARY OF THE INVENTION

In one aspect, the present invention provides for a storage stand for use with a standard propane cylinder and a gas hose equipped with a torch nozzle, wherein said torch stand comprises a vertically extending elevating pole including a hose storage element configured to receive the gas hose coiled thereon, an attachment element extending from the lower portion of said elevating pole and configured to be reversibly mounted to the integrated handle on a collar of a standard propane cylinder, and a nozzle storage element; wherein said hose storage element is distal to said stabilizing element; said nozzle storage element comprises a hollow space adapted to receive said torch nozzle of a hose equipped with a torch nozzle; and said attachment element comprises a reversible fixative device, an arcuate stabilizing element extending perpendicular from said elevating pole comprising a planar bottom surface by which the arcuate stabilizing element may substantially rest on the upper surface of the upper portion of the handle formed by the collar on a standard propane cylinder, and an arm substantially distal to the elevating pole, said arm perpendicular to both the elevating pole and the arcuate stabilizing element. In one embodiment said reversible fixative device is a C-clamp. In a further embodiment said nozzle storage element further comprises a hollow cylinder with an open upper aperture and an open lower aperture intersected by at least one lateral element.

DETAILED DESCRIPTION OF THE PRESENT INVENTION

The present invention provides for a storage stand, which is capable of reversible attachment to a standard propane cylinder, which allows for the easy storage of both the hose and nozzle of a propane torch along with the standard propane cylinder for which it is intended to be used. It is contemplated by the present invention that a standard propane cylinder comprises at least one handle fixed by an aperture in the upper collar of the propane cylinder. While the composition of the storage stand may be of any material capable of supporting the weight of the nozzle and hose elements of the propane torch, while also considering the temperature that the nozzle of the propane torch may achieve during prolonged use. In a preferred embodiment the storage stand of the present invention is comprised of metal, more preferably aluminum or low carbon steel with a rust resistant coating.

Figure 1:
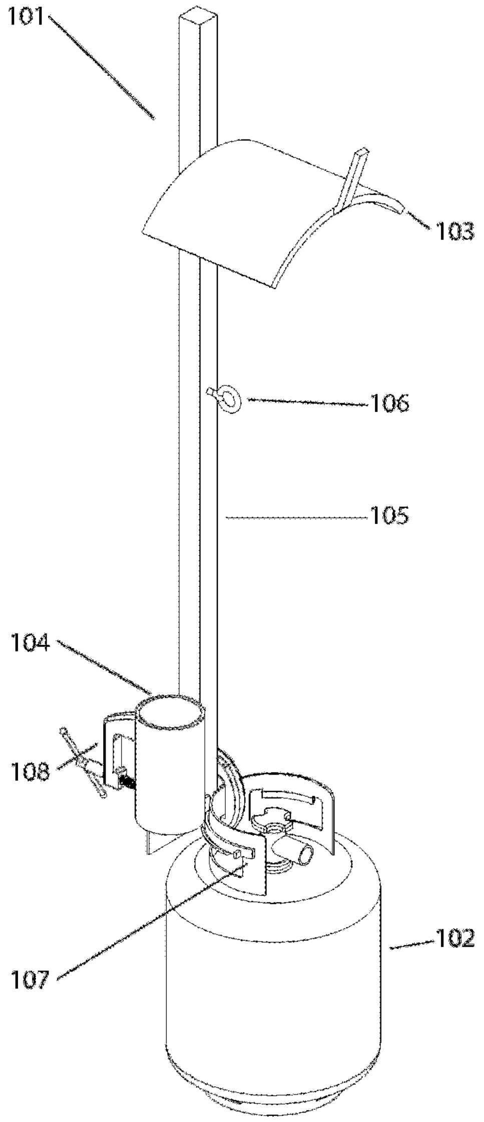
FIG. 1 shows the storage stand of the present invention, reversibly secured to a standard propane cylinder.

FIG. 1 shows the storage stand of the present invention 101, reversibly attached to a Standard Propane Cylinder 102, comprising a hose storage stand 103 substantially disposed distal from the Standard Propane Cylinder 102, a nozzle storage stand comprising an open cylinder 104 substantially adjacent to the Standard Propane Cylinder, and the elevating pole 105 upon which the hose storage stand 103, nozzle storage stand 104 are located, and attachment element as described in further detail herein. Optionally included is eyehook 106, which can be used for temporary storage of accessories using reversible fixation clips, including but not limited to a carabiner, for temporary storage of accessories such as strikers, lighters, or other elements useful for ignition of the torch. Further, stabilizing element 107, which is further illustrated and described herein, works in combination with the reversible fixative of the storage stand 101 to the collar of the standard propane cylinder by way of a C-clamp 108, as generally known in the art. Stabilizing element 107 inserts within the integrated handle present in standard propane cylinder, such that in combination with C-clamp 108, provides improved stability to the storage stand 101.

Figure 2:
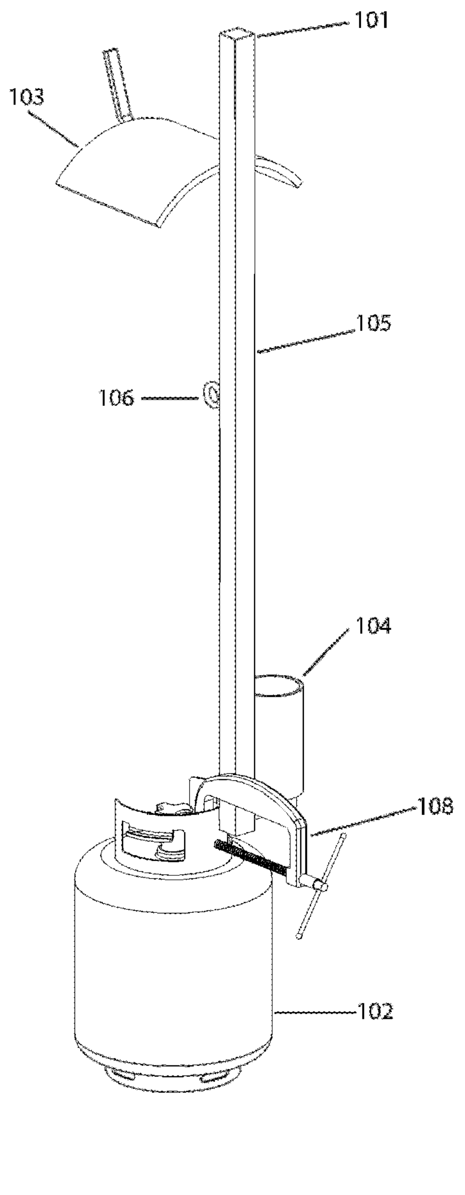
FIG. 2 shows a reverse view of the storage stand of the present invention, reversibly secured to a standard propane cylinder.

FIG. 2 shows the reverse of FIG. 1, better illustrating the reversible attachment of the storage stand 101 to a standard propane cylinder 102 by way of reversible fixation by C-clamp 108. FIG. 2 also provides a reverse illustration of the elevating pole 105, hose storage stand 103, nozzle storage stand 104 and optional eyehook 106. As can be seen in FIG. 2, C-clamp 108 is irreversibly attached to the elevating pole 105; with such attachment means known in the art. It is contemplated that, in the alternative, C-clamp 108 may be formed as part of elevating pole 105, though it is more economical to irreversibly fixed a reversible fixing element, such as exemplary C-clamp 108, to the elevating pole 105, rather than forming it as part of said elevating pole 105.

It is contemplated that the storage stand of the present invention may be composed of materials other than steel, including thermoplastics, fiberglass, or other polymers or ceramics as known in the art. As such, the irreversible fixation of elements that comprise the storage stand of the present invention will be based upon the specific materials used for the individual elements; the selection of which within the knowledge of ones skilled in the art. In a preferred embodiment, C-clamp 108 and elevating pole 105 are composed of a metal or metal alloy, and C-clamp 108 is fixed to elevating pole 105 by means of heat welds.

Figure 3:
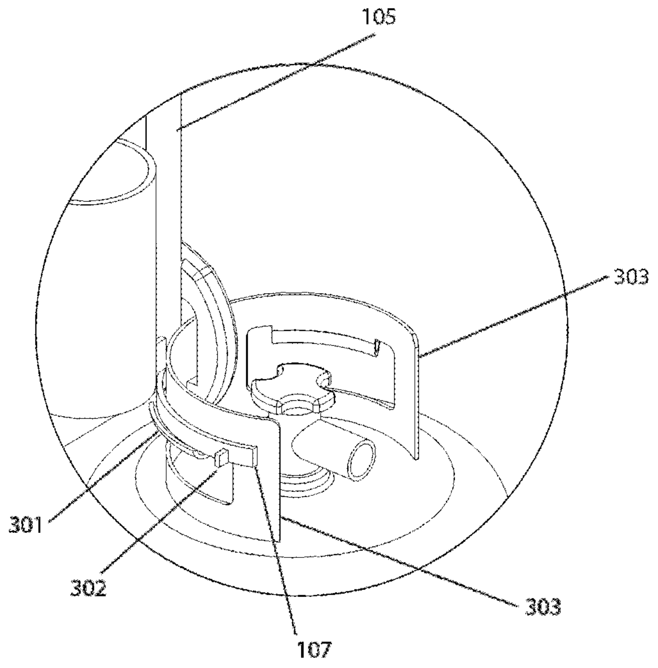
FIG. 3 shows an expanded illustration of the interaction between the storage stand of the present invention and the collar of a standard propane cylinder.

FIG. 3 shows a close-up illustration of the stabilizing element 107, which rests within the upper surface of the handle formed from the collar of the standard propane cylinder 301. Cross bar 302 forms part of the stabilizing element 107, with a cruciform formed by the cross bar 302 and stabilizing element, extending through the handle opening (not shown) and creating linear base upon which the storage stand's weight is supported, the linear base described by the upper surface of the collar handle 301 and the lower surface of the collar handle opening, impinging on the upper surface of the cross bar 302 which extends through the handle aperture. The stabilizing element having, as a lower boundary, the collar handle 301 and crossbar 302 resisting any upward motion by its impinging on protective collar 303, the upward bias towards motion arising by way of collar handle 301 acting as a fulcrum to the weight of elevating pole 105. It is contemplated that stabilizing element 107 with crossbar 302, along with reversible fixative 108 exemplified in FIG. 1 by a C-clamp; form the attachment element of the storage stand of the present invention.

Figure 4:
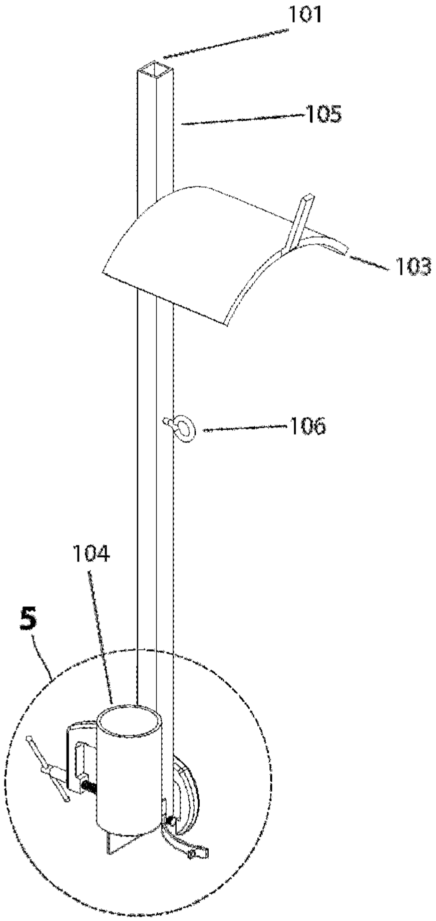
FIG. 4 shows an exemplary of the storage stand of the present invention.

FIG. 4 shows the storage stand of the present invention, 101, separate from the standard propane cylinder to which it is contemplated to be reversibly attached; with elevating pole 105, hose storage stand 103, optional eye-hook 106, and nozzle storage stand 104. An expanded illustration of nozzle storage stand 104 and surrounding features is presented in FIG. 5.

Figure 5:
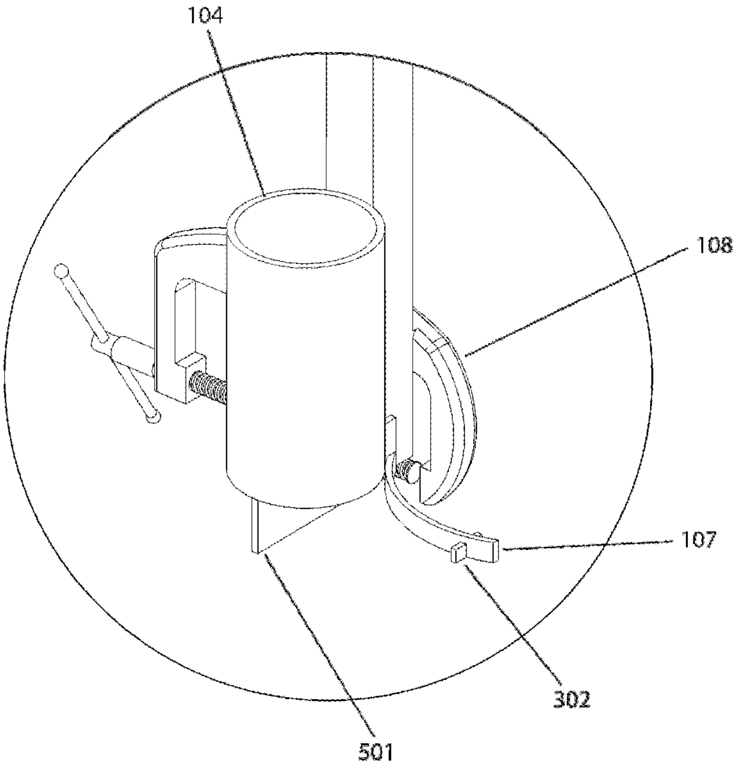
FIG. 5 shows an expanded illustration of an exemplary of the nozzle storage device of the storage stand.

FIG. 5 shows an expanded illustration of nozzle storage stand 104, which is a hollow cylinder, the axis of which is oriented parallel to the longitudinal axis of elevating pole, the aperture of the hollow cylinder distal to stabilizing element 107 is open and capable of receiving the nozzle of the desired propane torch, with the aperture proximal to stabilizing element 107 closed, either in its entirety or, as displayed, by way of a crosspiece 501, providing a rest for the nozzle inserted in the top of nozzle storage stand 104. Stabilizing element 107, with cross bar 302, are also shown, along with exemplary reversible fixative of the storage stand to the collar of the standard propane cylinder (no shown) by way of C-clamp 108.

Figure 6:
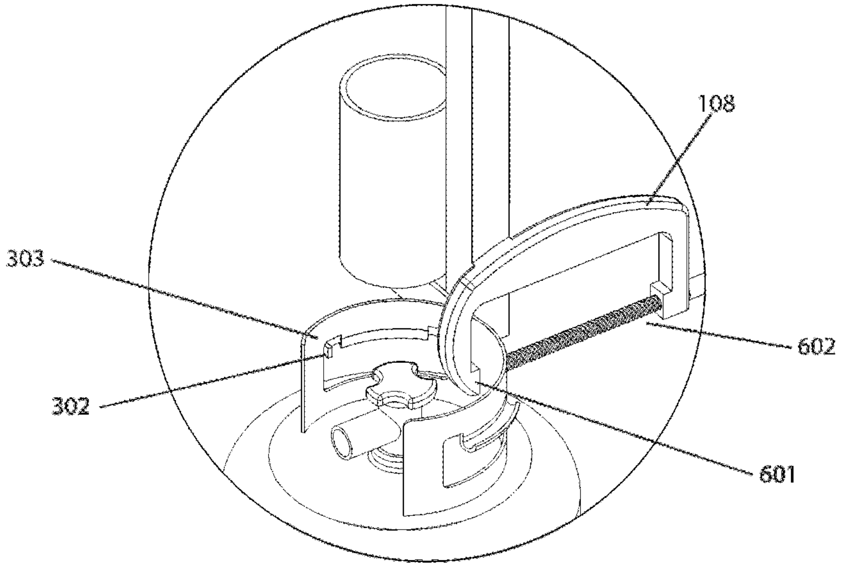
FIG. 6 shows an expanded illustration of the reversible attachment of the storage stand of the present invention to a standard propane cylinder.

FIG. 6 shows the reverse view of the storage stand reversibly fixed to a standard propane cylinder, as provided in FIG. 3, further showing the interaction of cross bar 302 with protective collar 303. The storage stand of the present invention being reversibly secured by C-clamp 108, with the movable screw element 602 of said C-clamp applying pressure to protective collar 303, and the fixed element of said C-clamp, 601, thereby biased against the opposite side of protective collar 303.

Figure 7:
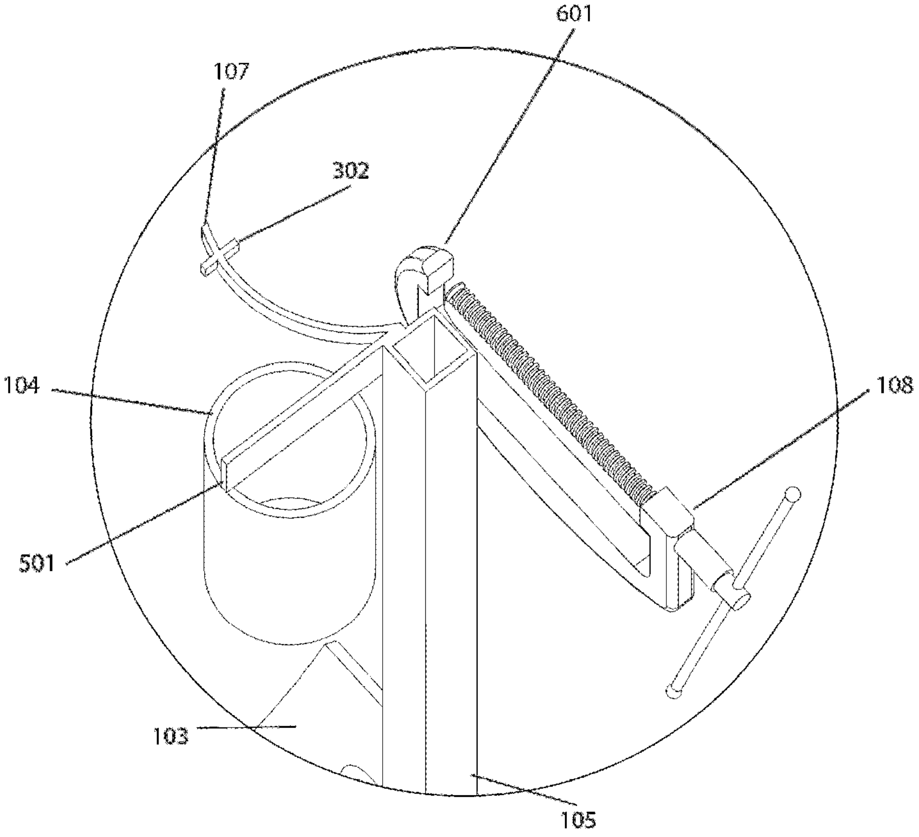
FIG. 7 shows the underside of the storage stand of the present invention.

FIG. 7 shows the underside of the storage stand of the present invention to better illustrate the elements which provide stabilization of said storage stand to the standard propane cylinder (not shown). Elevating pole 105 is shown as being hollow, though the present invention contemplates either hollow or otherwise; selection of the structure of elevating pole 105 being based upon weight, strength and material compositions; all as within the knowledge and capability of those skilled in the art. Crosspiece 501 is shown as interrupting hollow cylinder forming nozzle storage stand 104; as well as C-clamp 108 which is itself comprised of fixed element 601 and a movable screw element 602. Stabilizing element 107, intersected by cross bar 302 is shown, displaying the planar surface described by the two elements which is optional. The underside of hose storage stand 103 is also displayed.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. A storage stand for use with a standard propane cylinder and a gas hose equipped with a torch nozzle, wherein said torch stand comprises A vertically extending elevating pole including a
- hose storage element configured to receive the gas hose coiled thereon,
- an attachment element extending from the lower portion of said elevating pole and configured to be reversibly mounted to the integrated handle on a collar of a standard propane cylinder, and
- a nozzle storage element;

wherein
- said nozzle storage element comprises a hollow space adapted to receive said torch nozzle of a hose equipped with a torch nozzle; and
- said attachment element comprises
  - a reversible fixative device,
  - an arcuate stabilizing element extending perpendicular from the longitudinal axis of said elevating pole comprising
    - a planar bottom surface by which the arcuate stabilizing element may substantially rest on the upper surface of the upper and outer portion of the handle formed by the collar on a standard propane cylinder,
    - an arm substantially distal to the elevating pole, said arm perpendicular to both the elevating pole and the arcuate stabilizing element, and said hose storage element is distal to said arcuate stabilizing element.

2. The storage stand of claim 1 wherein said reversible fixative device is a C-clamp.

3. The storage stand of claim 2 wherein said nozzle storage element further comprises a hollow cylinder with an open upper aperture and an open lower aperture intersected by at least one lateral element.

* * * * *